United States Patent
Park

(10) Patent No.: US 10,611,361 B2
(45) Date of Patent: Apr. 7, 2020

(54) HYBRID VEHICLE AND CONTROL METHOD OF DRIVING MODE THEREFOR

(71) Applicants: HYUNDAI MOTOR COMPANY, Seoul (KR); KIA MOTORS CORPORATION, Seoul (KR)

(72) Inventor: Joon Young Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 226 days.

(21) Appl. No.: 15/847,487

(22) Filed: Dec. 19, 2017

(65) Prior Publication Data

US 2019/0001957 A1  Jan. 3, 2019

(30) Foreign Application Priority Data

Jun. 30, 2017 (KR) .......................... 10-2017-0083487

(51) Int. Cl.
*B60W 20/12* (2016.01)
*B60W 10/08* (2006.01)
(Continued)

(52) U.S. Cl.
CPC ............... *B60W 20/12* (2016.01); *B60K 6/48* (2013.01); *B60W 10/02* (2013.01); *B60W 10/06* (2013.01);
(Continued)

(58) Field of Classification Search
CPC .. B60W 20/12; B60W 20/13; B60W 2520/10; B60W 2550/142; B60W 2550/143; B60W 2550/20; Y10S 903/93
(Continued)

(56) References Cited

U.S. PATENT DOCUMENTS

2013/0073113 A1  3/2013  Wang et al.
2014/0288743 A1*  9/2014  Hokoi ................... B60W 20/40
                                                         701/22
(Continued)

FOREIGN PATENT DOCUMENTS

WO    2015-124978 A1    8/2015
WO    2015-124983 A1    8/2015

OTHER PUBLICATIONS

European Office Action dated Mar. 14, 2018 issued in European Patent Application No. 17209907.9.

*Primary Examiner* — Krishnan Ramesh
(74) *Attorney, Agent, or Firm* — Morgan, Lewis & Bockius LLP

(57) ABSTRACT

A hybrid vehicle, and a control method of a driving mode therefor includes steps of determining a traveling path, dividing the traveling path into a plurality of sections according to a driving condition, allocating a class corresponding to a driving condition of a corresponding section among a plurality of predetermined classes, to each of the plurality of sections, calculating energy consumption of each of the plurality of sections, sequentially summing the energy consumption of the plurality of sections in an order determined with reference to energy consumption rates for modes corresponding to the respective classes until a predetermined first condition is satisfied, and determining a first class corresponding to a section as a last target of summing when the first condition is satisfied, as a second condition and as a reference for switching from a first driving mode to a second driving mode.

17 Claims, 9 Drawing Sheets

(51) Int. Cl.
- *B60W 50/00* (2006.01)
- *B60W 10/02* (2006.01)
- *B60W 10/10* (2012.01)
- *B60K 6/48* (2007.10)
- *B60W 10/06* (2006.01)
- *B60W 20/13* (2016.01)

(52) U.S. Cl.
CPC ............ *B60W 10/08* (2013.01); *B60W 10/10* (2013.01); *B60W 20/13* (2016.01); *B60W 50/0097* (2013.01); *B60K 2006/4825* (2013.01); *B60W 2050/0089* (2013.01); *B60W 2520/10* (2013.01); *B60W 2550/141* (2013.01); *B60W 2550/142* (2013.01); *B60W 2550/143* (2013.01); *B60W 2550/20* (2013.01); *B60W 2550/402* (2013.01); *B60W 2710/244* (2013.01); *Y10S 903/93* (2013.01)

(58) Field of Classification Search
USPC .......................................................... 701/22
See application file for complete search history.

(56) References Cited

U.S. PATENT DOCUMENTS

| | | | |
|---|---|---|---|
| 2015/0241227 A1* | 8/2015 | Ogawa | G01C 21/3469 701/22 |
| 2015/0241228 A1* | 8/2015 | Ogawa | G01C 21/34 701/22 |
| 2015/0241234 A1* | 8/2015 | Ogawa | B60W 50/0097 701/22 |
| 2016/0185339 A1* | 6/2016 | Ogawa | B60W 50/0097 701/22 |
| 2016/0207521 A1* | 7/2016 | Ogawa | B60W 50/0097 |
| 2016/0221567 A1* | 8/2016 | Ogawa | B60W 20/40 |
| 2016/0362097 A1* | 12/2016 | Ogawa | B60W 50/0097 |
| 2016/0362098 A1* | 12/2016 | Ogawa | B60W 10/26 |
| 2017/0043761 A1* | 2/2017 | Morisaki | B60W 50/0097 |
| 2017/0066429 A1* | 3/2017 | Ogawa | B60L 58/13 |
| 2018/0339697 A1* | 11/2018 | Ogawa | B60K 6/445 |

* cited by examiner

-PRIOR ART-

-PRIOR ART-

-PRIOR ART-

-PRIOR ART-

FIG. 11
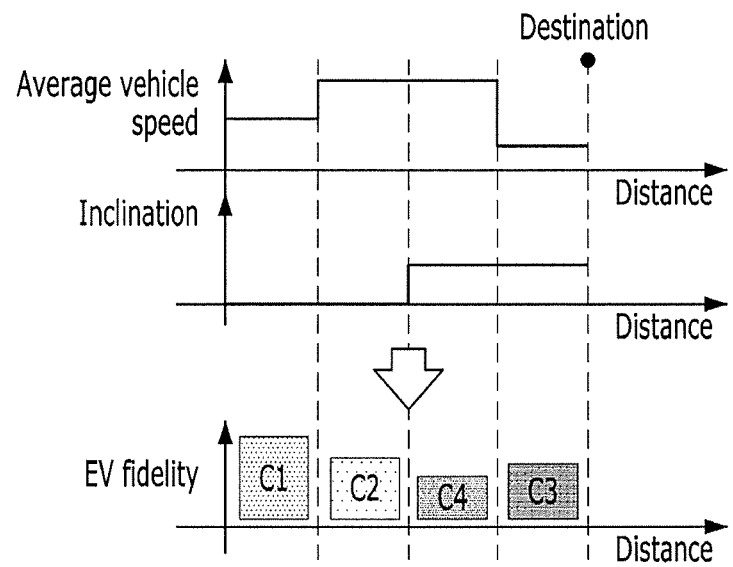
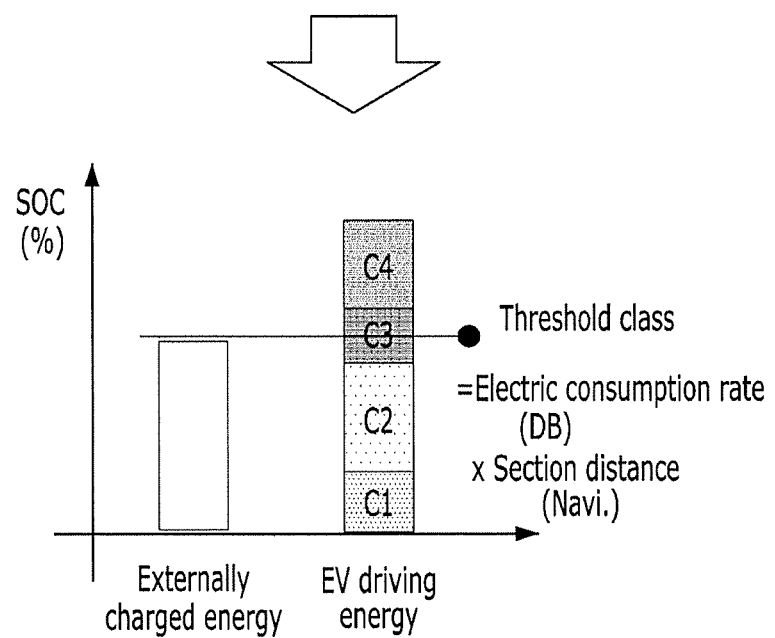

HYBRID VEHICLE AND CONTROL METHOD OF DRIVING MODE THEREFOR

This application claims the benefit of Korean Patent Application No. 10-2017-0083487, filed on Jun. 30, 2017 in the Korean Intellectual Property Office (KIPO), which is hereby incorporated by reference as if fully set forth herein.

BACKGROUND

Field

The present disclosure relates to a hybrid vehicle and a control method of a driving mode therefor, and more particularly, to a hybrid vehicle and a control method thereof for switching driving modes related to change in a battery state of charge (SoC) using path information to a destination.

Discussion of the Related Art

In general, a hybrid electric vehicle (HEV) refers to a vehicle that uses two power sources including an engine and an electric motor. An HEV has excellent fuel efficiency and engine performance compared with a vehicle including only an internal combustion engine and is also advantageous for lowering emissions and, thus, has been actively developed recently.

Such a hybrid vehicle travels in two modes according to a powertrain used to drive the vehicle. One of the modes is an electric vehicle (EV) mode in which the vehicle travels using only an electric motor and the other mode is a hybrid electric vehicle (HEV) mode of operating both an electric motor and an engine to acquire power. A hybrid vehicle switches between the two modes according to driving conditions.

In addition to the aforementioned classification of a driving mode according to a powertrain, in particular, in the case of a plug-in hybrid electric vehicle (PHEV), a driving mode may be classified into a charge depleting (CD) mode and a charge sustaining (CS) mode based on change in a battery state of charge (SoC). In general, a vehicle travels by driving an electric motor using battery power in a CD mode and travels using only engine power not to further lower a battery SoC in a CS mode.

In the case of a general PHEV, the vehicle travelling in a CD mode, irrespective of a driving condition such as driving load, whether a battery is rechargeable, and a distance to a destination, switches the current mode to a CS mode as an SoC is depleted, which will be described with reference to FIG. 1.

FIG. 1 shows a diagram showing an example of a case in which a general PHEV switches between modes.

In FIG. 1, the horizontal axis indicates a distance, the vertical axis of an upper graph indicates the battery's SoC of the PHEV, and the vertical axis of a lower graph indicates a driving load of the PHEV.

First, referring to the lower graph of FIG. 1, downtown road, national highway, and expressway sections are encountered between a starting point and a destination, and a path along which driving load is relatively lowered in the stated order of expressway-national highway-downtown road is present. When the general PHEV travels along the path, the vehicle starts traveling in a CD mode without consideration of change in driving load and, then, switches to a CS mode when the SoC is lowered below a predetermined reference.

However, the CD mode has relatively advantageous in efficiency during low speed/low load driving and the CS mode has relatively advantageous in efficiency during high speed/high load driving. Accordingly, as described above, when modes are switched based on an SoC value alone, driving load and energy efficiency characteristics of a hybrid powertrain are not considered and, thus, efficiency is highly degraded on some paths. The energy efficiency characteristics of the hybrid powertrain will be described with reference to FIG. 2.

FIG. 2 shows a diagram for explanation of powertrain energy efficiency characteristics of a general hybrid vehicle.

In FIG. 2, the horizontal axis indicates a power of a powertrain and the vertical axis indicates a system efficiency of a powertrain.

Referring to FIG. 2, EV mode traveling using an electric motor is effective in a section with low power but HEV mode traveling is effective after an intersection point at power (A) of EV mode efficiency and HEV mode efficiency. In general, an electric motor reaches a maximum output at a point at power (C) earlier than an engine.

Accordingly, the power at point (A) may be a reference power level for engine driving in the CS mode and the power at point (B) with maximum efficiency in the HEV mode may be a reference power level for engine driving in the CD mode.

To overcome the aforementioned problem in terms of efficiency, an adaptive mode switching (in short "adaptive CD/CS") method may be considered. The adaptive CD/CS method is a control method of automatically switching CD/CS modes to achieve optimum efficiency using a distance until charge (DUC) as a distance to next recharging, drive to empty (DTE) as a driving distance range in an EV mode, a driving condition, and so on when the vehicle travels a longer distance than an all electric range (AER) as a driving distance range using an electric motor.

For example, when the adaptive CD/CS method is used, a vehicle travels in a CS mode when current load is equal to or greater than a predetermined value based on a driving condition and the vehicle travels in a CD mode when the driving load is low. Needless to say, when DUC is less than or equal to DTE, even if a vehicle travels through a section with high driving load, the vehicle may travel in the CD mode, depleting an SoC and, thus, may be guided to deplete an SoC in the DUC. The adaptive CD/CS method will be described below with reference to FIG. 3.

FIG. 3 shows a diagram showing an example of a case in which a general PHEV switches between modes when an adaptive CD/CS method is applied. In FIG. 3, the meaning of horizontal and vertical axes and path configuration are assumed to be the same as in FIG. 1.

Referring to FIG. 3, the vehicle may start traveling in a CD mode but, when the vehicle enters a section (here, an expressway) with driving load that exceeds predetermined driving load, even if an SoC is equal to or greater than a predetermined value, the vehicle may switch to a CS mode and, may re-switch to the CD mode in a section with DUC less than or equal to DTE, thereby enabling effective driving.

However, in a general adaptive CD/CS method, predetermined driving load is set to a fixed value and, thus, CS mode driving cannot be ensured at a point with the highest load from a traveling path, which will be described below with reference to FIG. 4.

FIG. 4 shows a diagram for explanation of a problem of a general adaptive CD/CS method. In FIG. 4, the meaning of horizontal and vertical axes is assumed to be the same as in FIG. 3. However, differently from FIG. 3, it is assumed that a national highway with low driving load is positioned ahead of an expressway on a path and driving load as a mode switching reference is satisfied from a national highway section.

Referring to FIG. 4, the vehicle starts traveling in a CD mode and continues to travel in a CD mode as driving load in a downtown road section is maintained to be equal to or less than the mode switching reference. Then, when the vehicle enters the national highway section with driving load that exceeds the mode switching reference, seven if an SoC is equal to or greater than a predetermined value, the vehicle switches to a CS mode and, in this case, when a section with DUC less than or equal to DTE is within the national highway section, even if the vehicle does not enter the expressway section, the vehicle re-switches to the CD mode. Accordingly, there is a problem in that CS mode driving is not enabled in the expressway section with actually the highest driving load.

As a result, in the general adaptive CD/CS method, optimum efficiency driving cannot be ensured due to fixed mode switching reference load.

SUMMARY

An object of the present disclosure is to provide an effective control method of mode switching and a hybrid vehicle for performing the same.

In particular the present disclosure provides a method of variably setting an optimum mode switching reference and a vehicle for performing the same.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the purpose of the present disclosure, as embodied and broadly described herein, a control method of mode switching of a hybrid vehicle includes determining a traveling path, dividing the traveling path into a plurality of sections according to a driving condition, allocating a class corresponding to a driving condition of a corresponding section among a plurality of predetermined classes, to each of the plurality of sections, calculating energy consumption of each of the plurality of sections, sequentially summing the energy consumption of the plurality of sections in an order determined with reference to energy consumption rates for modes corresponding to the respective classes until a predetermined first condition is satisfied, and determining a first class corresponding to a section as a last target of summing when the first condition is satisfied, as a second condition and as a reference for switching from a first driving mode to a second driving mode.

In another aspect of the present disclosure, a hybrid vehicle includes a first controller configured to acquire driving condition information of a set traveling path when the traveling path is set, and a second controller configured to divide the traveling path into a plurality of sections according to the acquired driving condition information, to allocate a class corresponding to a driving condition of a corresponding section among a plurality of predetermined classes, to each of the plurality of sections, to calculate energy consumption of each of the plurality of sections, to sequentially sum the energy consumption of the plurality of sections in an order determined with reference to energy consumption rates for modes corresponding to the respective classes until a predetermined first condition is satisfied, and to determine a first class corresponding to a section as a last target of summing when the first condition is satisfied, as a second condition and as a reference for switching from a first driving mode to a second driving mode.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure.

FIG. 11 shows a diagram showing an example of a procedure of determining a mode switching reference according to an embodiment of the present disclosure.

DETAILED DESCRIPTION

Figure 1:
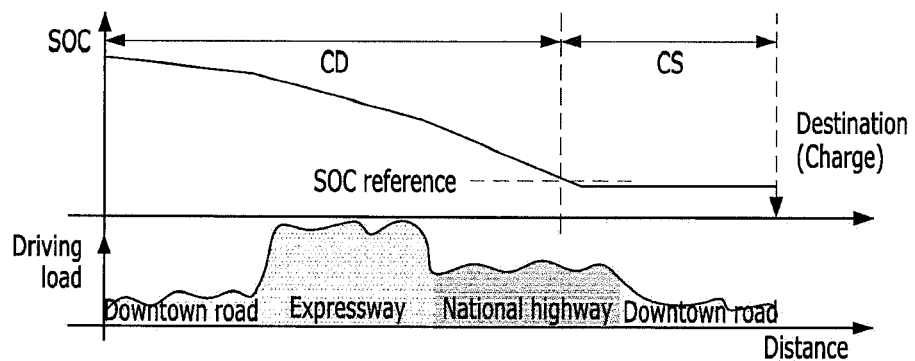
FIG. 1 is a diagram showing an example of a case in which a general plug-in hybrid electric vehicle (PHEV) switches between modes.
Figure 2:
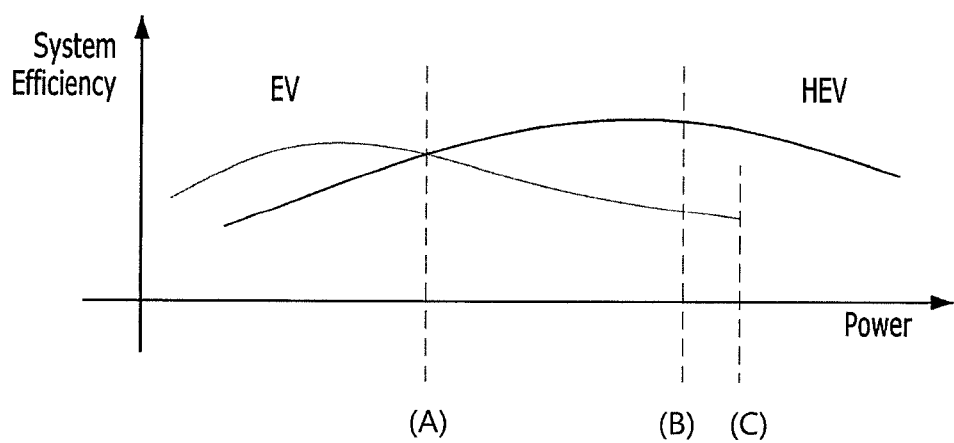
FIG. 2 is a diagram for explanation of powertrain energy efficiency characteristics of a general hybrid vehicle.
Figure 3:
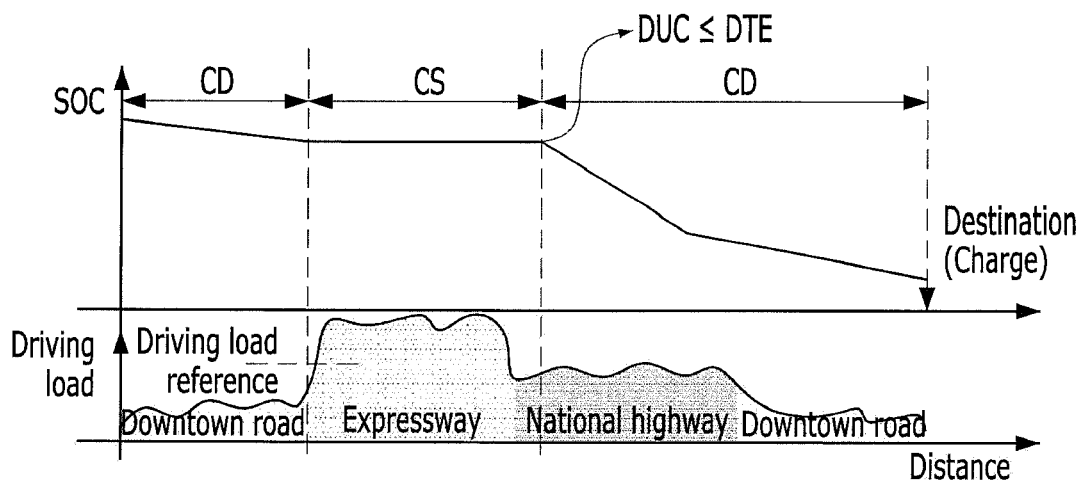
FIG. 3 is a diagram showing an example of a case in which a general PHEV switches between modes when an adaptive CD/CS method is applied.

Exemplary embodiments of the present disclosure are described in detail so as for those of ordinary skill in the art to easily implement with reference to the accompanying drawings. However, the present disclosure may be implemented in various different forms and is not limited to these embodiments. To clearly describe the present disclosure, a part without concerning the description is omitted in the drawings, and like reference numerals in the specification denote like elements.

In addition, when a certain part "includes" a certain component, this indicates that the part may further include another component instead of excluding another component unless there is no different disclosure. The same reference numbers will be used throughout the drawings and the specification to refer to the same parts.

Prior to description of a mode switching method according to an embodiment of the present disclosure, a structure of a hybrid vehicle to which embodiments of the present disclosure are applicable will be described with reference to FIG. 5.

Figure 5:
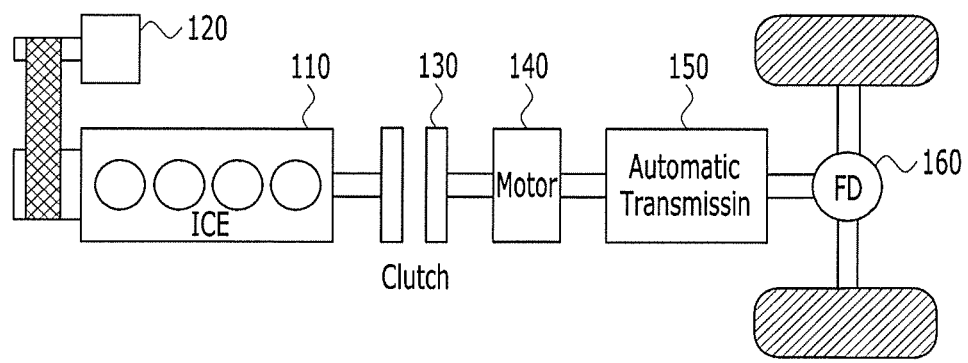
FIG. 5 is a diagram illustrating an example of a powertrain structure of a hybrid vehicle to which embodiments of the present disclosure are applicable.

FIG. 5 shows a diagram illustrating an example of a powertrain structure of a hybrid vehicle to which embodiments of the present disclosure are applicable.

FIG. 5 illustrates a powertrain of a hybrid vehicle including a parallel type hybrid system including an electric motor (or a driving motor) 140 and an engine clutch 130 that are installed between an internal combustion engine (ICE) 110 and a transmission 150.

In such a hybrid vehicle, in general, when a driver presses an accelerator after turning on the vehicle, the motor 140 is driven using power of a battery while the engine clutch 130 is open and the motor 140 transmits power to move wheels through the transmission 150 and a final drive (FD) 160 (i.e., EV mode). As the vehicle gradually accelerates, high driving force is further required and, in this case, an auxiliary motor (or a starter generator motor 120) may be operated to drive the engine 110.

Accordingly, when rotational speeds of the engine 110 and the motor 140 are equal to each other, the engine clutch 130 is then engaged such that both the engine 110 and the motor 140 drive the vehicle (i.e., transition to an HEV mode from an EV mode). When a predetermined engine off condition such as vehicle deceleration is satisfied, the engine clutch 130 is open and the engine 110 stops (i.e., transition to an EV mode from an HEV mode). In addition, the hybrid vehicle converts the driving force of a wheel into electric energy to recharge a battery (not shown in FIG. 5), which is referred to as braking energy regeneration or regenerative braking.

The starter generator motor 120 functions as a starter motor when the engine ICE is turned on and functions as a generator after the engine ICE is turned on or when rotational energy is recovered during engine off and, thus, the starter generator motor 120 may also be referred to as a hybrid starter generator (HSG) and, as necessary, may be referred to as an auxiliary motor.

Figure 6:
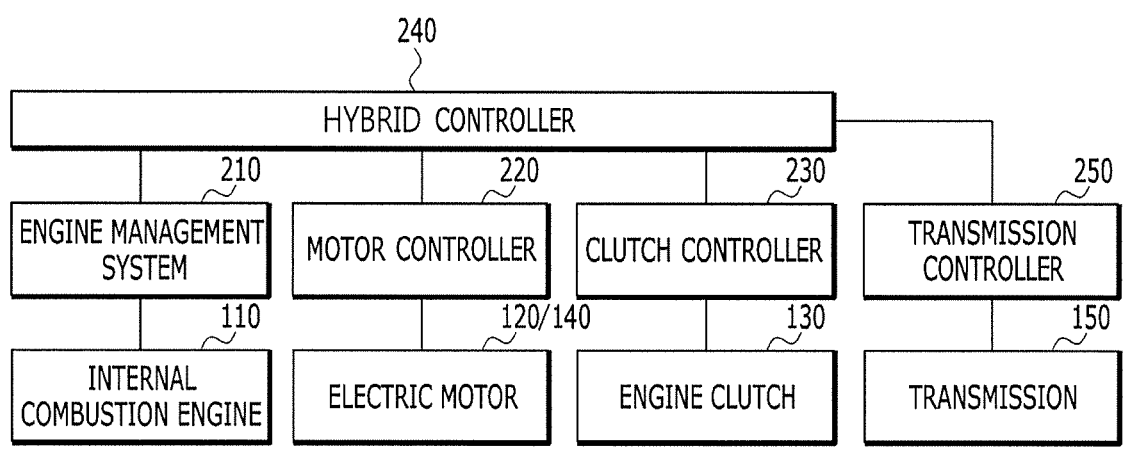
FIG. 6 is a block diagram showing an example of a control system of a hybrid vehicle to which embodiments of the present disclosure are applicable.

A relationship among controllers of a vehicle including the aforementioned powertrain is shown in FIG. 6. Each of the controllers may be an electronic circuitry that performs the aforementioned or the following functions.

FIG. 6 is a block diagram showing an example of a control system of a hybrid vehicle to which embodiments of the present disclosure are applicable.

Referring to FIG. 6, in the hybrid vehicle to which embodiments of the present disclosure are applicable, the internal combustion engine (ICE) 110 may be controlled by an engine controller 210, torque of the starter generator motor 120 and the motor 140 may be controlled by a motor controller (MCU) 220, and the engine clutch 130 may be controlled by a clutch controller 230. Here, the engine controller 210 may also be referred to as an engine management system (EMS) 210. In addition, the transmission 150 may be controlled by a transmission controller 250. As necessary, the starter generator motor 120 and the motor 140 may be controlled by different separate motor controllers.

Each controller may be connected to a hybrid controller (or, hybrid control unit (HCU)) 240 for controlling an overall mode switching procedure as a high-level controller and may provide information required to switch driving modes and to control an engine clutch during gear shift, and/or information required to control engine off or may perform an operation according to a control signal under control of a hybrid controller 240.

In more detail, the hybrid controller 240 may determine whether modes are switched depending on a driving state of a vehicle. For example, the hybrid controller 240 may determine an open time of the engine clutch (EC) 130 and may control hydraulic pressure (in the case of a wet EC) or control torque capacity (in the case of a dry EC) when the EC is open. The hybrid controller 240 may determine an EC state (lock-up, slip, open, etc.) and may control a time for stop of fuel injection in the engine or ICE 110. The hybrid controller 240 may transmit a torque command for controlling torque of the starter generator motor 120 to the MCU 220 to control engine off and may control engine rotational energy recovery. In addition, the hybrid controller 240 may determine a mode switching condition during control of adaptive mode switching and may control a low-level controller for mode switching.

Needless to say, it would be obvious to one of ordinary skill in the art that the aforementioned relationship between the controllers and functions/divisions of the controllers are exemplary and, thus, are not limited to the terms. For example, the hybrid controller 240 may be embodied by allowing any one of other controllers except for the hybrid controller 240 to provide a corresponding function or two or more of other controllers may distribute and provide the corresponding function.

Hereinafter, an effective control method of mode switching according to an embodiment of the present disclosure will be described based on the aforementioned vehicle configuration.

As described above, in general adaptive mode switching, a driving load (hereinafter, a "mode switching reference load") as a reference of switching between modes (CD↔CS) is uniformly determined and cannot ensure CS mode driving in a maximum load section.

Accordingly, an embodiment of the present disclosure proposes a hybrid vehicle and a control method thereof for combining various additional information items based on an entire path to set optimum mode switching reference load or a mode switching time point based thereon using traveling path information.

According to an aspect of the present embodiment, the traveling path information may be navigation information. Here, the navigation information may include at least one of a road type, an inclination degree, average vehicle speed, or a congestion degree (real-time traffic information) and, in general, may be obtained through a navigation system, i.e., an audio/video/navigation (AVN) system but the present disclosure is not limited thereto. For example, the navigation information may be acquired from a telematics center through a telematics modem or may be acquired via data center/server/cloud access using a wireless communication module and the vehicle speed information and the like may be acquired through various sensors in a vehicle.

The additional information may include at least one of a driving condition (hereinafter, referred to a "class" for convenience) which is classified through the aforementioned navigation information or is set with a plurality of predetermined stages, powertrain energy consumption information for each class, or driver driving tendency information. Here, the class may be classified by classifying driving load determined depending on various driving condition factors in an order that is effective for EV mode driving. For example, when the class is classified into 10 stages from 1 to 10, class 1 may correspond to driving load with a driving condition in which battery consumption per unit traveling distance in an EV mode is lowest and class 10 may correspond to a driving condition in which battery consumption per unit traveling distance in an EV mode is the highest.

A mode switching method using the aforementioned information will be described with reference to FIG. 7.

Figure 7:
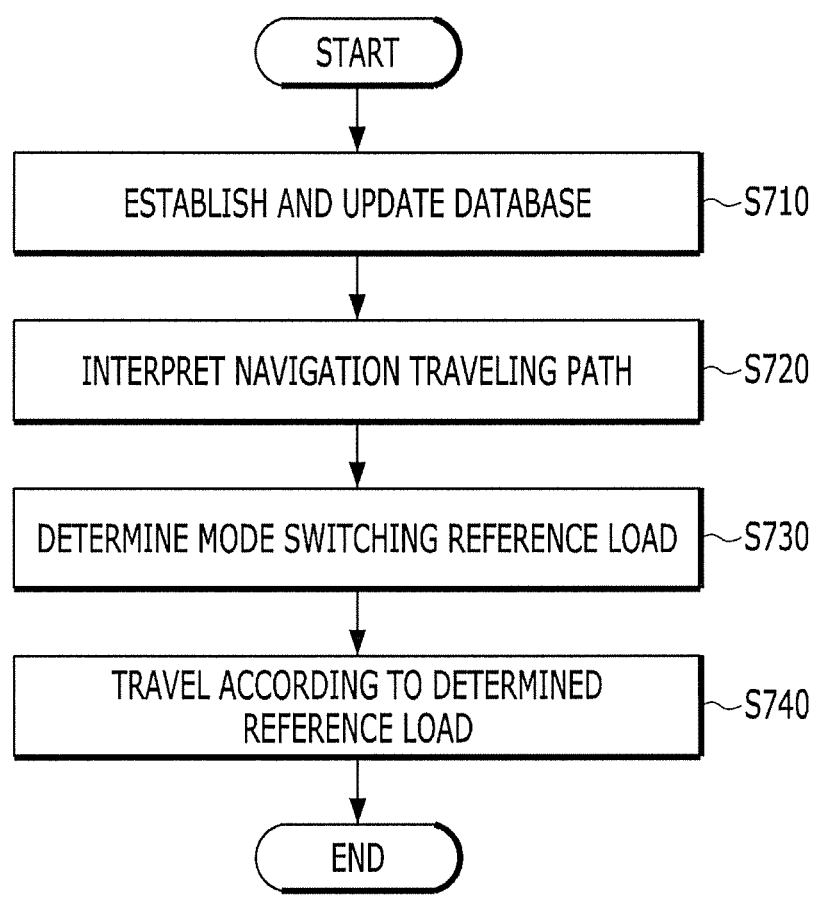
FIG. 7 is a flowchart showing an example of a mode switching method according to an embodiment of the present disclosure.

FIG. 7 shows a flowchart showing an example of a mode switching method according to an embodiment of the present disclosure.

Referring to FIG. 7, first, a database DB may be established and the established database DB may be updated (S710). The database DB may include class information and powertrain energy consumption rate information for each class. The powertrain energy consumption rate information for each class may indicate an energy consumption rate for each powertrain under a driving load condition corresponding to a corresponding class, i.e., energy consumption per unit distance. For example, the powertrain energy consumption rate information for each class may include battery consumption information in a CD (EV) mode and fuel consumption information in a CS (HEV) mode per unit distance for each class. In addition, the powertrain energy consumption rate information for each class may be updated via cumulative learning during traveling. The present operation will be described in more detail with reference to FIG. 8.

When a destination is set in an AVN system while the data base is provided, a traveling path to a destination from a starting point may be interpreted (S720). For example, in the present operation, the traveling path may be divided into a plurality of sections using information of average vehicle speed, inclination degree, and the like on the traveling path and classes may be allocated to the respective sections.

The database may be stored in a memory of an arbitrary controller (e.g., an AVN controller or a hybrid controller) of a vehicle.

When the traveling path is completely interpreted, the mode switching reference load may be determined using the interpretation result (S730). In this case, the mode switching reference load may be interpreted as classes. For example, when the number of divided sections is 4 and classes 1 to 4 are allocated to the respective sections, a current mode may be determined to be switched to a CS mode in a section corresponding to class 4 among the plurality of divided sections, which will be described in more detail with reference to FIGS. 10 and 11.

When the mode switching reference load is determined, mode switching may be performed as a vehicle reaches a section, driving load of which is equal to or greater than the determined reference load during driving (S740).

Each of the aforementioned operations may be broadly re-classified into an offline procedure and an online procedure. Here, the offline procedure may refer to a procedure of establishing a database by a vehicle manufacturer before a separate driver actually drives a vehicle. The online procedure may refer to a procedure in which a separate driver actually drives a vehicle with destination setting and, in this case, driving habit of a driver may be applied to update of a database.

The offline procedure may correspond to an operation except for operation S710 of FIG. 7 and the online procedure may correspond to update of operation S710 of FIG. 7 and operations subsequent thereto.

First, the offline procedure will be described with reference to FIG. 8.

Figure 8:
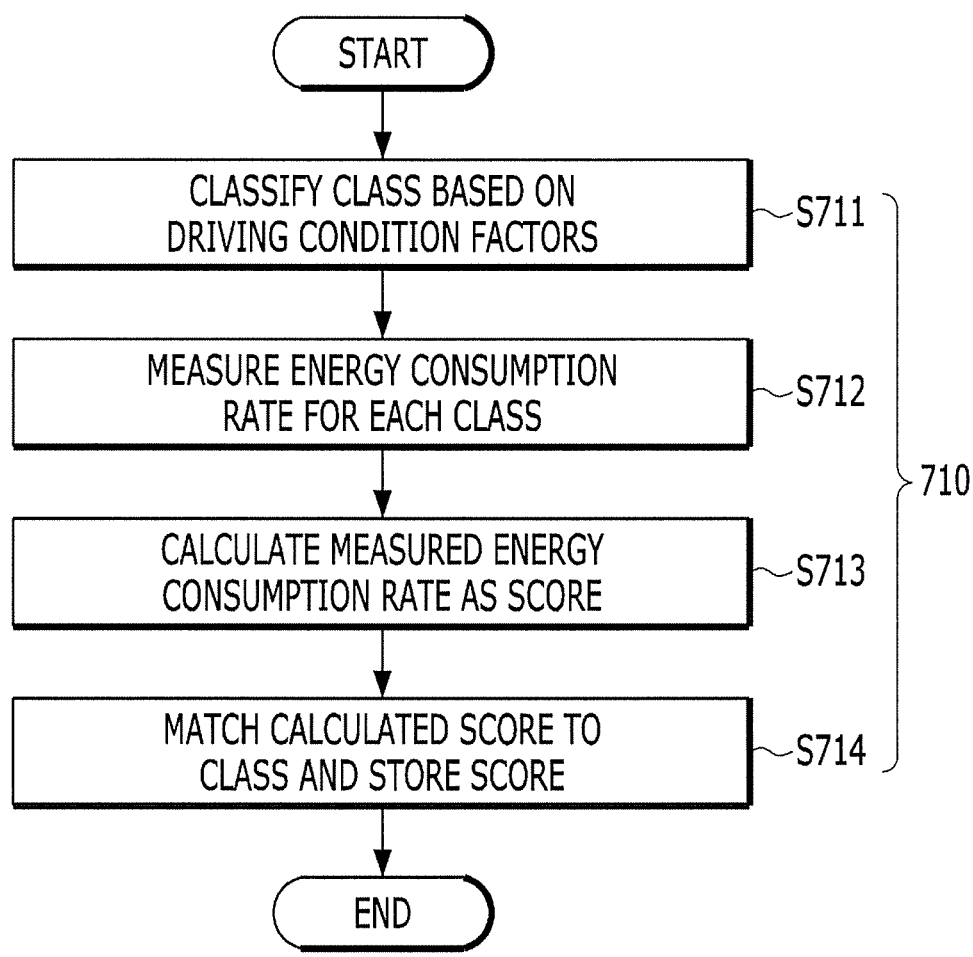
FIG. 8 is a diagram showing an example of a procedure of establishing a database for mode switching according to an embodiment of the present disclosure.

FIG. 8 shows a diagram showing an example of a procedure of establishing a database for mode switching according to an embodiment of the present disclosure.

Referring to FIG. 8, first, various driving conditions may be classified into a plurality of classes based on various driving condition factors (a road type, average vehicle speed, an inclination degree, etc.) (S711). The respective classes may correspond to different driving load ranges according to the driving condition factors.

Figure 9:
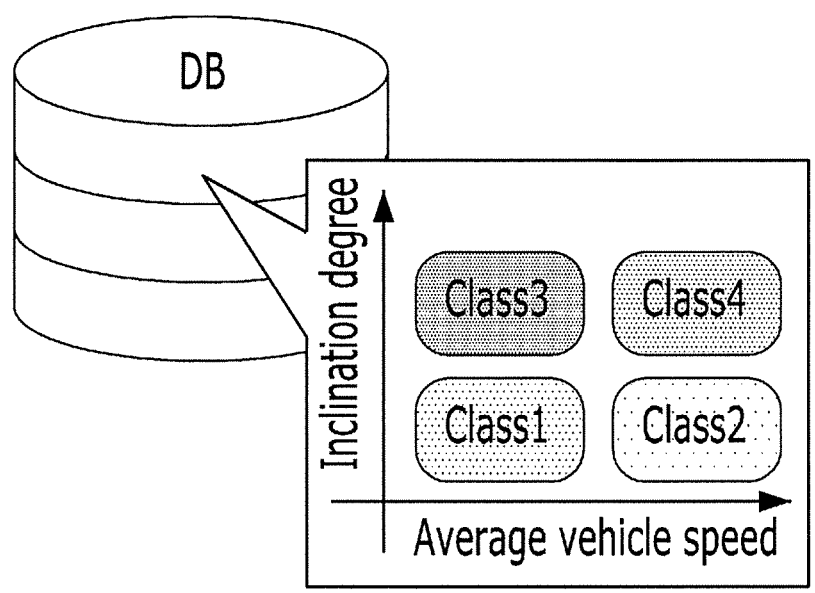
FIG. 9 shows a diagram showing an example of a relationship between a driving condition factor and a class classification according to an embodiment of the present disclosure.

An example of the class classification is shown in FIG. 9. FIG. 9 shows a diagram showing an example of a relationship between a driving condition factor and a class classification according to an embodiment of the present disclosure. In FIG. 9, it is assumed that the driving condition factor is average vehicle speed and an inclination degree and the class is classified into a total of four classes.

In general, it is deemed that driving load is increased as both average vehicle speed and an inclination degree are further increased. Accordingly, assuming that the classes are numbered in ascending order from lowest driving load, when both average vehicle speed and an inclination degree are low, class 1 may be assigned and, when both average vehicle speed and an inclination degree are high, class 4 may be assigned. However, there is a problem in terms of a numbering order between the case of a low inclination degree and high average vehicle speed and the case of a high inclination degree and low vehicle speed and, in this case, numbering may be performed based on EV driving efficiency (i.e., fidelity or an EV driving fuel consumption rate). For example, when EV driving efficiency in the case of high average vehicle speed and low inclination degree is higher than that of the case of a high inclination degree and low vehicle speed, a class of the former case may be numbered class 2. Such EV driving efficiency may be evaluated as an "equivalent factor" that will be described below and, in this regard, it may be deemed that an equivalent factor value becomes more appropriate for EV driving as the equivalent factor value is further lowered. Needless to say, this is exemplary and the present disclosure is not limited to the class classification operation and the numbering reference and, thus, driving load is not inevitably proportional to class numbering sequence.

Referring back to FIG. 8, after class classification is performed, an energy consumption rate for each class may be measured (S712). A powertrain energy consumption rate for each class may include battery consumption (e.g., kWh/km) in a CD mode and fuel consumption (e.g., liter/km) in a CS mode per unit distance for each class, as described above. Energy consumption per unit distance may be acquired by measurement of each consumption amount via an actual experiment, a simulation, or a combination thereof by a manufacturer according to vehicle type. The acquired fuel consumption information may be stored in a database.

It is difficult to directly compare efficiencies using the energy consumption per unit distance because fuel types differ according to driving mode but, whether an EV mode or an HEV mode has high efficiency among classes may be compared. Accordingly, to compare efficiencies of driving modes for each class, a ratio of battery consumption and fuel consumption per unit distance may be calculated as a score (hereinafter, referred to as an equivalent factor) (S713). For example, when efficiencies in an EV mode are compared, the equivalent factor may be calculated per unit distance (battery consumption/fuel consumption) and may have a unit of kWh/liter and, in this case, it may be deemed that a class is appropriate for EV driving as an equivalent factor of the class is further lowered.

When equivalent factor values for respective classes are obtained, the obtained equivalent factor values may be matched to the respective classes and may be stored in a database (S714).

As a result, an equivalent factor value and energy consumption rate information for each powertrain may be matched to each class, the equivalent factor value may be applied to an order of summing energies for respective sections, which will be described below, and the energy consumption rate information may be used to calculate an energy amount required for driving in a specific mode in a corresponding section. In addition, the equivalent factor is battery consumption/fuel consumption per unit distance, as described above and, thus, may be considered as "energy consumption rate for each mode".

Hereinafter, the online procedure will be described with reference to FIG. 10.

Figure 10:
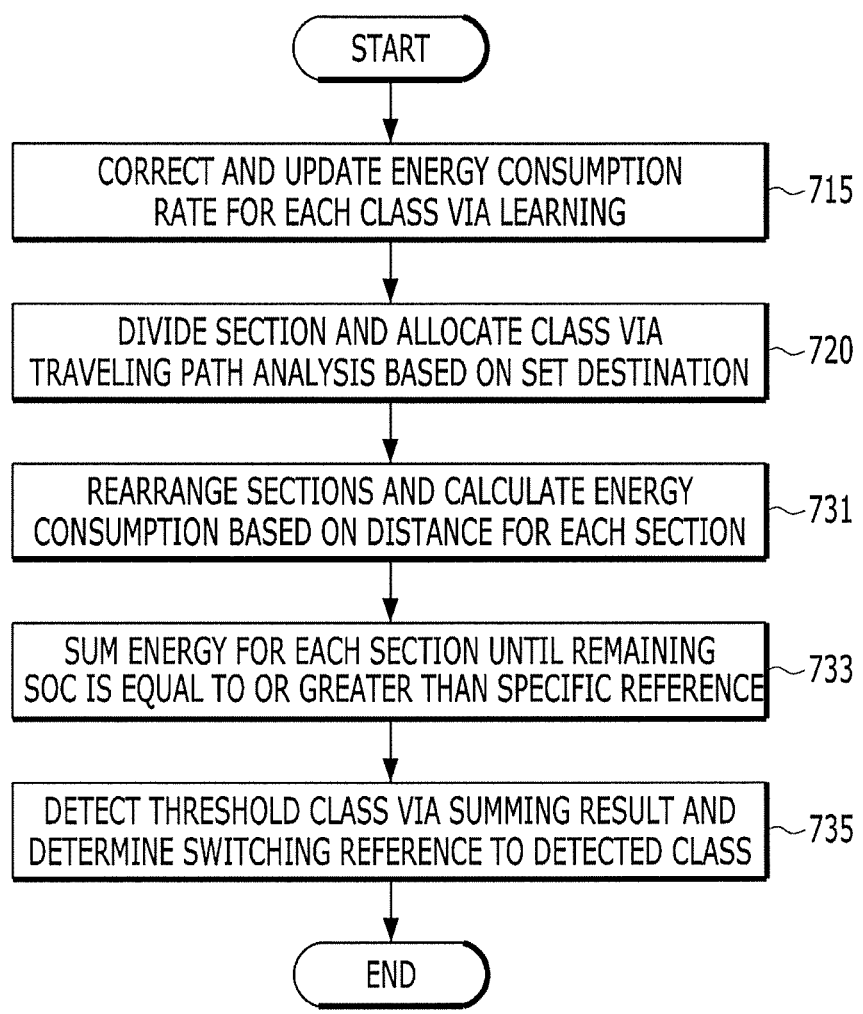
FIG. 10 shows a diagram showing an example of a procedure of updating a database after the database for mode switching is established and setting a mode switching reference according to an embodiment of the present disclosure.

FIG. 10 shows a diagram showing an example of a procedure of updating a database after the database for mode switching is established and setting a mode switching reference according to an embodiment of the present disclosure.

Referring to FIG. 10, first, energy consumption rate information for each class may be updated via compensation through learning (S715). This is an operation for providing a reference for determining a more accurate time point of switching driving modes to compensate for a difference between an environment of generating a database and an actual environment of a separate driver. That is, this is because energy consumption rates are different according to actual driving tendency of a separate driver despite the same traveling distance since the aforementioned operation S712 of FIG. 8 is performed in an experiment/simulation environment of a manufacturer.

The present operation may be performed by measuring actual CD mode battery consumption and CS mode fuel consumption per unit distance according to driver tendency for each class corresponding to each driving condition and multiplying the measured consumption information with a predetermined learning coefficient and then cumulatively summing the multiplication result and previous consumption information. For example, when battery consumption stored in a database via $n^{th}$ learning is referred to as B(n) and battery consumption lastly updated in the database via previous turn (i.e., (n−1)$^{th}$ learning is referred to as B(n−1), B(n) may be updated by applying, to B(n−1), a value obtained by multiplying "current battery consumption/B(n−1)" with a learning coefficient. Accordingly, as the learning coefficient is increased, current battery consumption more affects an update result, and as the learning coefficient is lowered, the current battery consumption less affects the update result.

As necessary, the present operation may be performed in real time, may be performed with a predetermined period, or may be omitted.

When a destination is set through a navigation device, information corresponding to a driving condition factor on a path from a starting point to the destination may be acquired through navigation information, the corresponding path may be divided into a plurality of sections through the driving condition factor information, and classes may be allocated to the respective divided sections (S720).

For example, as shown in Table 1 below, the path between the starting point and the destination may be divided into eight sections using average vehicle speed, an inclination degree, and a road type as a driving condition factor.

TABLE 1

| Section | 1 | 2 | 3 | ... | 8 |
|---|---|---|---|---|---|
| Average vehicle speed | 30 | 45 | 80 | ... | 150 |
| Inclination degree | 0 | 3 | 0 | ... | −1 |
| Road type | Downtown road | Downtown road | Expressway | ... | Arterial highway |
| Length | 15 | 6 | 25 | ... | 8 |

When the classes are allocated to the respective sections, equivalent factors from a database may also be referred to. For example, classes and equivalent factors for the respective sections of the present path may be represented as shown in Table 2 below.

TABLE 2

| Section | 1 | 2 | 3 | ... | 8 |
|---|---|---|---|---|---|
| Class | 2 | 6 | 9 | ... | 5 |
| Equivalent factor | 0.85 | 0.97 | 1.1 | ... | 0.9 |

Then, the sections may be rearranged in ascending order from the lowest equivalent factor corresponding to each class and energy consumption for each section may be calculated (S731). Rearrangement of sections in ascending order from the lowest equivalent factor may refer to arrangement of sections in an order that is appropriate for EV driving.

The energy consumption for each section may be obtained by multiplying battery consumption per unit distance of a class allocated to a corresponding section by a distance for each section. The energy consumption for each section may be represented in energy units (e.g., kWh) or may be converted into SoC and represented. An example of a state in which rearrangement of section sequences and calculation of energy consumption are completed is shown in Table 3 below.

TABLE 3

| Section | 1 | 8 | 2 | ... | 3 |
|---|---|---|---|---|---|
| Class | 2 | 5 | 6 | ... | 9 |
| Battery consumption | 23 | 13 | 11 | ... | 50 |

As shown in Table 3 above, section 1 to which class (0.85) with the lowest equivalent factor, shown in Table 2 above, is allocated may be firstly arranged, section 8 to which class 5 (0.9) with a second lowest equivalent factor is allocated may be secondly arranged, and section 2 to which class 6 (0.97) with a third lowest equivalent factor is allocated may be thirdly arranged.

When sections are completely rearranged, energy consumption for sections may be summed until the remaining SoC is equal to or greater than a specific reference (S733). Here, the energy consumption for each section may refer to battery consumption for each section and a summing order may correspond to the rearrangement result. In addition, the specific reference may be a reference for forcibly switching to a CS mode.

For example, when the reference for forcibly switching to the CS mode is SoC 0%, energy consumption for sections may be summed until energy consumption for a corresponding section reaches total battery energy corresponding to a current SoC. In addition, in the case of a PHEV, the remaining SoC up to the specific reference may correspond to pure externally charged energy. As another example, a distance for each section and all electric range AER may be used instead of energy consumption for each section. That is, energy consumption for sections may be summed in the rearrangement order until a distance for a corresponding section reaches the AER or more.

When a reference for terminating summing is satisfied, a class corresponding to a section as a last target of summing may be determined as a threshold class and, the threshold class or a class adjacent thereto may be determined as a mode switching reference (S735).

In more detail of the aforementioned procedure, EV driving (i.e., a CD mode) may be performed in an order from a section in which EV driving is most effective and, otherwise, CS mode driving may be performed in the other sections. Accordingly, upon detecting an entrance into a section (i.e., a section corresponding to a class with lower EV driving efficiency or a higher equivalent factor than in the class determined in operation S735) corresponding to driving load equal to or greater than driving load corresponding to the class determined in operation S735, a vehicle may switch to a CS mode and, in a section in which corresponding driving load is not satisfied during CS mode driving or at a point in which DUC is equal to or less than DTE despite a section in which the corresponding driving load is satisfied, the vehicle may switch to a CD mode for fuel saving and SoC depletion.

To aid in understanding of the description, operations S720 to S735 that have been described above with reference to FIG. 10 will be further described briefly with reference to FIG. 11.

FIG. 11 shows a diagram showing an example of a procedure of determining a mode switching reference according to an embodiment of the present disclosure.

Three graphs are shown in an upper part of FIG. 11. In the three graphs, the horizontal axis commonly indicates distance to a destination from a starting point and, in upper and intermediate graphs, vertical axes correspond to average vehicle speed and an inclination degree, as driving condition factors, respectively. In addition, in a lower graph, a vertical axis indicates EV fidelity that corresponds to an equivalent factor value for each class.

Referring to the three graphs of the upper part, a distance is divided into four sections according to change in average vehicle speed and inclination degree and classes 1 to 4 are allocated to respective sections of C1 to C4 (i.e., which corresponds to operation S720). For example, class 1 is allocated to a first section in which inclination degree is zero and average vehicle speed is low and class 4 is allocated to a third section in which an inclination degree is greater than zero and average vehicle speed is high.

Based on the lower graph of EV fidelity among the three graphs of the upper part, when the sections are rearranged for summing (i.e., operation S731), a summing order may be determined as the stated order of C1, C2, C3, and C4. Needless to say, in operation S731, battery consumption for each section may also be calculated depending on a distance for each section. Hereinafter, operations S733 and S735 will be described with reference to a lower part of FIG. 11.

The lower part of FIG. 11 shows a graph for explanation of a summing procedure. In the graph of the lower part of FIG. 11, a horizontal axis indicates items classified for energy comparison and a vertical axis indicates SoC. It is assumed that battery consumption for each section is calculated as SoC and the remaining SoC up to a specific reference is SoC corresponding to externally charged energy.

Referring to the graph of the lower part of FIG. 11, until the remaining SoC becomes equal to or greater than an SoC corresponding to the externally charged energy, battery consumption for sections may be sequentially summed from a section corresponding to C1, i.e., in a Y-axis direction. When battery consumption for sections may be summed up to sections corresponding to C3 from C1, the total consumption may be equal to or greater than the externally charged energy. In this case, class 3 is a threshold class.

When class 3 as the threshold class is a driving mode switching reference, a vehicle may switch to a CS mode in a third section corresponding to class 4 with higher driving load (i.e., lower EV fidelity) than class 3, based on the graphs of the upper part of FIG. 11.

In the example of FIG. 11, the mode switching reference may be class 3 but, according to setting, a class adjacent thereto, i.e., class 2 or class 4 may be the mode switching reference. Needless to say, when class 2 among the adjacent classes is the mode switching reference, CS mode driving begins in section C2 and, thus, a vehicle may switch to a CD mode at a point with DUC less than or equal to DTE before the vehicle arrives at a section C4 or C3 with higher driving load than in a section C2 and, in this case, CS mode driving may not be ensured in a third section of C4 that is a maximum load section. Accordingly, when a class adjacent to a threshold class is selected, a class with lower EV fidelity than in the threshold class may be selected as a driving mode switching condition instead of a class with higher EV fidelity (i.e., EV driving efficiency) than in the threshold class, as necessary (e.g., when a section with the highest class is positioned after a section with a next highest class).

Figure 4:
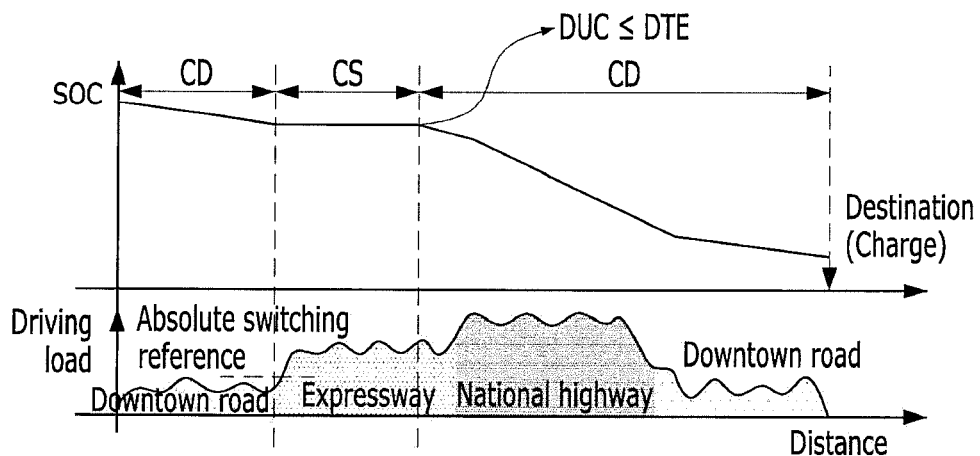
FIG. 4 is a diagram for explanation of a problem of a general adaptive charge depleting/charge sustaining (CD/CS) method.
Figure 12:
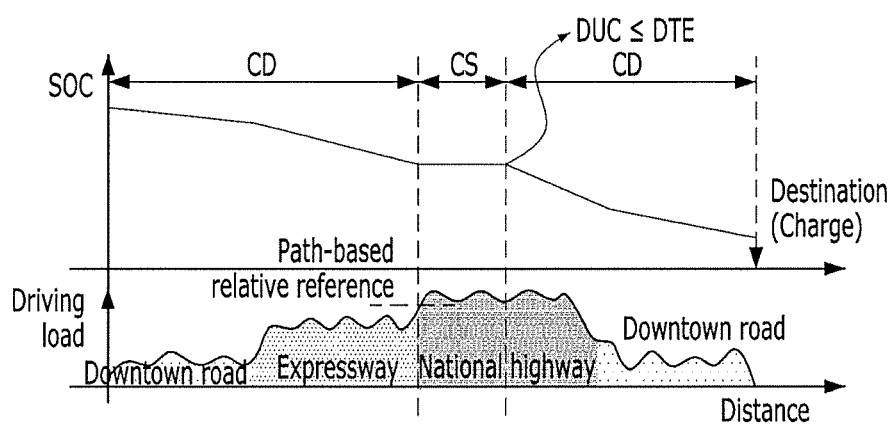
FIG. 12 shows a diagram for explanation of an effect of a method of determining a mode switching reference via comparison with FIG. 4, according to an embodiment of the present disclosure.

FIG. 12 shows a diagram for explanation of an effect of a method of determining a mode switching reference via comparison with FIG. 4, according to an embodiment of the present disclosure.

The meaning of horizontal and vertical axes and path configuration in FIG. 12 are assumed to be the same as in FIG. 4. However, the driving mode switching reference according to the aforementioned embodiment is assumed to be determined as driving load of a class corresponding to an expressway section.

Referring to FIG. 12, in a first downtown road section, a vehicle travels in a CD mode, like in FIG. 4. However, differently from FIG. 4, a driving mode switching reference is load corresponding to an expressway section and, thus, the CD mode may also be maintained in a national highway section and may be switched to a CS mode in the expressway section with the highest driving load. Then, at a point with DUC less than or equal to DTE, the vehicle may switch to the CD mode for SoC depletion.

As a result, according to the present embodiment, CS mode driving may be ensured in a maximum load section.

In the above description, the aforementioned operations except for the offline procedure may be performed by one controller or may be performed by two or more controllers. For example, all of the operations except for the offline procedure are performed by a hybrid controller or, alternatively, when up to an operation of determining mode switching reference information (e.g., class information corresponding to mode switching reference load, a mode switching time point, or a mode switching reference) is performed by a controller (e.g., an AVN system or a dedicated separate controller) which performs a corresponding function and, then, the mode switching reference information is transmitted to a hybrid controller, from operation S740 is performed by the hybrid controller, which would be obvious to one of ordinary skill in the art.

The hybrid vehicle configured as described above according to at least one embodiment of the present disclosure may effectively control mode switching.

In particular, optimum mode switching reference load may be variably set in consideration of various factors such as road type, driving tendency, and driving load during control of adaptive mode switching to ensure CS mode driving in a maximum load section of a path.

It will be appreciated by persons skilled in the art that that the effects that could be achieved with the present disclosure are not limited to what has been particularly described hereinabove and other advantages of the present disclosure will be more clearly understood from the above detailed description taken in conjunction with the accompanying drawings.

The aforementioned present disclosure can also be embodied as computer readable code stored on a computer-readable non-transitory recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, carrier waves (e.g., transmission via the Internet), etc.

It will be apparent to those skilled in the art that various modifications and variations can be made in the present disclosure without departing from the spirit or scope of the present disclosure. Thus, it is intended that the present disclosure cover the modifications and variations provided they come within the scope of the appended claims and their equivalents.

What is claimed is:

1. A control method of mode switching, of a hybrid vehicle, the method comprising:
   determining a traveling path;
   dividing the traveling path into a plurality of sections according to a driving condition;
   allocating a class corresponding to a driving condition of a corresponding section among a plurality of predetermined classes, to each of the plurality of sections;
   calculating energy consumption of each of the plurality of sections;
   sequentially summing the energy consumption of the plurality of sections in an order determined with reference to energy consumption rates for modes corresponding to the respective predetermined classes until a predetermined first condition is satisfied; and
   determining a first class corresponding to a section as a last target of summing when the first condition is satisfied, as a second condition,
   wherein the second condition corresponds to a reference for switching from a first driving mode to a second driving mode,
   wherein the energy consumption rates for modes comprises a ratio of battery consumption and fuel consumption with respect to each of the plurality of predetermined classes, and
   wherein the order determined with reference to the energy consumption rates for modes has a higher priority in order as the ratio is lowered.

2. The method according to claim 1, wherein the calculating of the energy consumption is performed using energy information predetermined for each allocated class; and
   wherein the energy information comprises energy consumption information per unit distance predetermined for each of the plurality of classes and information on the energy consumption rates for modes.

3. The method according to claim 2, wherein the energy consumption information per unit distance comprises information on the battery consumption when the vehicle travels in an electric vehicle (EV) mode over unit distance with respect to each of the plurality of classes and information on the fuel consumption when the vehicle travels in a hybrid electric vehicle (HEV) mode.

4. The method according to claim 3, wherein the energy consumption of each of the plurality of sections is calculated by multiplying the battery consumption corresponding to a corresponding class with a section length, with respect to each of the plurality of sections.

5. The method according to claim 1, further comprising switching from the first driving mode to the second driving mode when the second condition is satisfied during driving on the traveling path.

6. The method according to claim 5, wherein a case in which the second condition is satisfied comprises a case in which the vehicle enters a section corresponding to the first class among the plurality of sections or a case in which the vehicle enters a section corresponding a second class positioned after the first class based on the energy consumption rates for modes.

7. The method according to claim 1, wherein the determining of the traveling path comprises setting a destination through a navigation system; and
   wherein the driving condition comprises at least one of an average vehicle speed, an inclination degree, or a congestion degree.

8. The method according to claim 1, wherein the first condition is satisfied when a result obtained in the sequentially summing of the energy consumption is equal to or greater than a current remaining amount or externally charged energy;
   wherein the first mode comprises a charge depleting (CD) mode; and
   wherein the second mode comprises a charge sustaining (CS) mode.

9. A hybrid vehicle comprising:
   a first controller configured to acquire driving condition information of a set traveling path when the traveling path is set; and
   a second controller configured to divide the traveling path into a plurality of sections according to the acquired driving condition information, to allocate a class corresponding to a driving condition of a corresponding section among a plurality of predetermined classes, to each of the plurality of sections, to calculate energy consumption of each of the plurality of sections, to sequentially sum the energy consumption of the plurality of sections in an order determined with reference to energy consumption rates for modes corresponding to the respective classes until a predetermined first condition is satisfied, and to determine a first class corresponding to a section as a last target of summing when the first condition is satisfied, as a second condition, wherein the second condition corresponds to a reference for switching from a first driving mode to a second driving mode, wherein the energy consumption rates for modes comprises a ratio of battery consumption and fuel consumption with respect to each of the plurality of classes, and wherein the order determined with reference to the energy consumption rates for modes has a higher priority in order as the ratio is lowered.

10. The hybrid vehicle according to claim 9, wherein the second controller calculates the energy consumption using energy information predetermined for each allocated class; and wherein the energy information comprises energy consumption information per unit distance predetermined for each of the plurality of classes and information of the energy consumption rates for modes.

11. The hybrid vehicle according to claim 10, wherein the energy consumption information per unit distance comprises information on the battery consumption when the vehicle travels in an electric vehicle (EV) mode over unit distance with respect to each of the plurality of classes and information on the fuel consumption when the vehicle travels in a hybrid electric vehicle (HEV) mode.

12. The hybrid vehicle according to claim 11, wherein the energy consumption of each of the plurality of sections is calculated by multiplying the battery consumption corresponding to a corresponding class with a section length, with respect to each of the plurality of sections.

13. The hybrid vehicle according to claim 9, wherein, when the second condition is satisfied during driving on the traveling path, the second controller performs control to switch from the first driving mode to the second driving mode.

14. The hybrid vehicle according to claim 13, wherein a case in which the second condition is satisfied comprises a case in which the vehicle enters a section corresponding to the first class among the plurality of sections or a case in which the vehicle enters a section, corresponding a second class positioned after the first class based on the energy consumption rate for modes.

15. The hybrid vehicle according to claim 9, wherein the first controller comprises an audio/video/navigation (AVN) controller; and wherein the driving condition comprises at least one of average vehicle speed, an inclination degree, or a congestion degree.

16. The hybrid vehicle according to claim 9, wherein the first mode comprises a charge depleting (CD) mode; and wherein the second mode comprises a charge sustaining (CS) mode.

17. The hybrid vehicle according to claim 9, wherein the first condition is satisfied when a result obtained in the sequentially summing of the energy consumption is equal to or greater than a current remaining amount or externally charged energy.

* * * * *